(12) United States Patent
Golgiri et al.

(10) Patent No.: US 11,845,467 B2
(45) Date of Patent: Dec. 19, 2023

(54) SYSTEMS AND METHODS FOR DIRECTING A PARKED VEHICLE TO TRAVEL FROM A FIRST PARKING SPOT TO A SECOND PARKING SPOT

(71) Applicant: Ford Global Technologies, LLC, Dearborn, MI (US)

(72) Inventors: Hamid M. Golgiri, Livonia, MI (US); Luke Niewiadomski, Dearborn, MI (US); Jiawei Liu, Shanghai (CN)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 17/008,591

(22) Filed: Aug. 31, 2020

(65) Prior Publication Data

US 2022/0063665 A1 Mar. 3, 2022

(51) Int. Cl.
| | | |
|---|---|---|
| *B60W 60/00* | (2020.01) | |
| *B60W 50/14* | (2020.01) | |
| *B60W 30/06* | (2006.01) | |
| *G01C 21/34* | (2006.01) | |
| *G01C 21/36* | (2006.01) | |
| *G08G 1/14* | (2006.01) | |

(52) U.S. Cl.
CPC ........ *B60W 60/0011* (2020.02); *B60W 30/06* (2013.01); *B60W 50/14* (2013.01); *G01C 21/3415* (2013.01); *G01C 21/3691* (2013.01); *G08G 1/143* (2013.01); *B60W 2050/146* (2013.01)

(58) Field of Classification Search
None
See application file for complete search history.

(56) References Cited

U.S. PATENT DOCUMENTS

| | | |
|---|---|---|
| 8,428,877 B2 | 4/2013 | Mathews |
| 9,701,305 B2 | 7/2017 | Paul et al. |

(Continued)

OTHER PUBLICATIONS

How to Schedule a lyft ride in advance-updated. Rideshare Silver. Dec. 18, 2018. https://www.youtube.com/watch?v=h1tcq9MLvWU (Year: 2018).*

(Continued)

*Primary Examiner* — James J Lee
*Assistant Examiner* — David Hatch
(74) *Attorney, Agent, or Firm* — Brandon Hicks; Eversheds Sutherland (US) LLP

(57) ABSTRACT

The disclosure generally pertains to systems and methods for directing a parked autonomous vehicle to travel autonomously from a parking spot to a pickup spot. In one example scenario, a user of a user device such as a smartphone, may launch a software application in the smartphone for summoning the autonomous vehicle that is parked in a parking lot or a road, for example. The software application displays a graphical rendering of the parking area together with an icon that can be dragged and dropped by the user at any convenient pickup spot in a valid drivable area shown on the graphical rendering. The user places the icon upon a desired pickup spot and the smartphone transmits a command to the autonomous vehicle to travel to the pickup spot. A real-time representation of a progress of the autonomous vehicle towards the pickup spot may be displayed on the user device.

10 Claims, 13 Drawing Sheets

(56) References Cited

U.S. PATENT DOCUMENTS

| | | | | |
|---|---|---|---|---|
| 9,972,201 B2* | 5/2018 | Wang | ................... | G08G 1/0129 |
| 10,627,815 B2* | 4/2020 | Dyer | ..................... | B60W 10/06 |
| 10,890,457 B2* | 1/2021 | Yu | ........................... | H04W 4/02 |
| 2016/0069705 A1* | 3/2016 | Brenner | ............... | G01C 21/343 |
| | | | | 701/428 |
| 2016/0327949 A1 | 11/2016 | Wilson et al. | | |
| 2017/0169535 A1* | 6/2017 | Tolkin | .............. | G06Q 10/06311 |
| 2020/0130676 A1* | 4/2020 | Smid | ..................... | B60W 30/06 |

OTHER PUBLICATIONS

Google, "Street View on Google Maps" Nov. 24, 2008, Youtube (Year: 2008).*

Oracle : Common Desktop Environment: Style Guide and Certification Checklist > Part I Style Guide > Chapter 3 Drag and Drop (Year: 2014).*

"Daimler and Bosch jointly premiere Automated Valet Parking in China," Web page <https://www.media.daimler.com/marsMediaSite/en/instance/ko/Daimler-and-Bosch-jointly-premiere-Automated-Valet-Parking-in-China.xhtml?bid=41244501.html>, 4 pages, retrieved from the internet on Dec. 2, 2020.

Jianbing Ni, et al., "Toward Privacy-Preserving Value Parking in Autonomous Driving", IEEE Transactions on Vehicular Technology, vol. 68, No. 3, Mar. 2919 (abstract).

\* cited by examiner

SYSTEMS AND METHODS FOR DIRECTING A PARKED VEHICLE TO TRAVEL FROM A FIRST PARKING SPOT TO A SECOND PARKING SPOT

BACKGROUND

An autonomous vehicle can perform various operations with various levels of autonomy. These operations are typically carried out by various automated controls of the vehicle in cooperation with sensors and detectors mounted on the vehicle (a camera, a radar/LIDAR system, and/or an ultrasonic object detector system, for example). The vehicle may be allowed to move autonomously on a road based on factors, such as road rules, traffic density, and safety considerations.

In some cases, an occupant of the autonomous vehicle may not be allowed to specify, or to change, a destination of the autonomous vehicle, such as, for example, a tourist riding a vehicle that moves along a pre-programmed travel path in an amusement park. In some other cases, an occupant of the autonomous vehicle may be allowed to specify, or to change, a destination of the autonomous vehicle such as, for example, when an individual decides to take a detour to a store while driving to work. In yet some other cases, a person standing outside a vehicle may be allowed to control certain operations of the vehicle. For example, a person standing on a curb may be provided supervisory control of a vehicle that is executing a self-parking maneuver to park in a curbside parking spot. However, the person standing on the curb may not be allowed to command the vehicle to travel from a remote parking spot that is out of sight of the person to a different parking spot, or even if allowed to do so, to have supervisory control of the vehicle as it moves to the other parking spot. It is therefore desirable to provide solutions that address this type of shortcoming.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
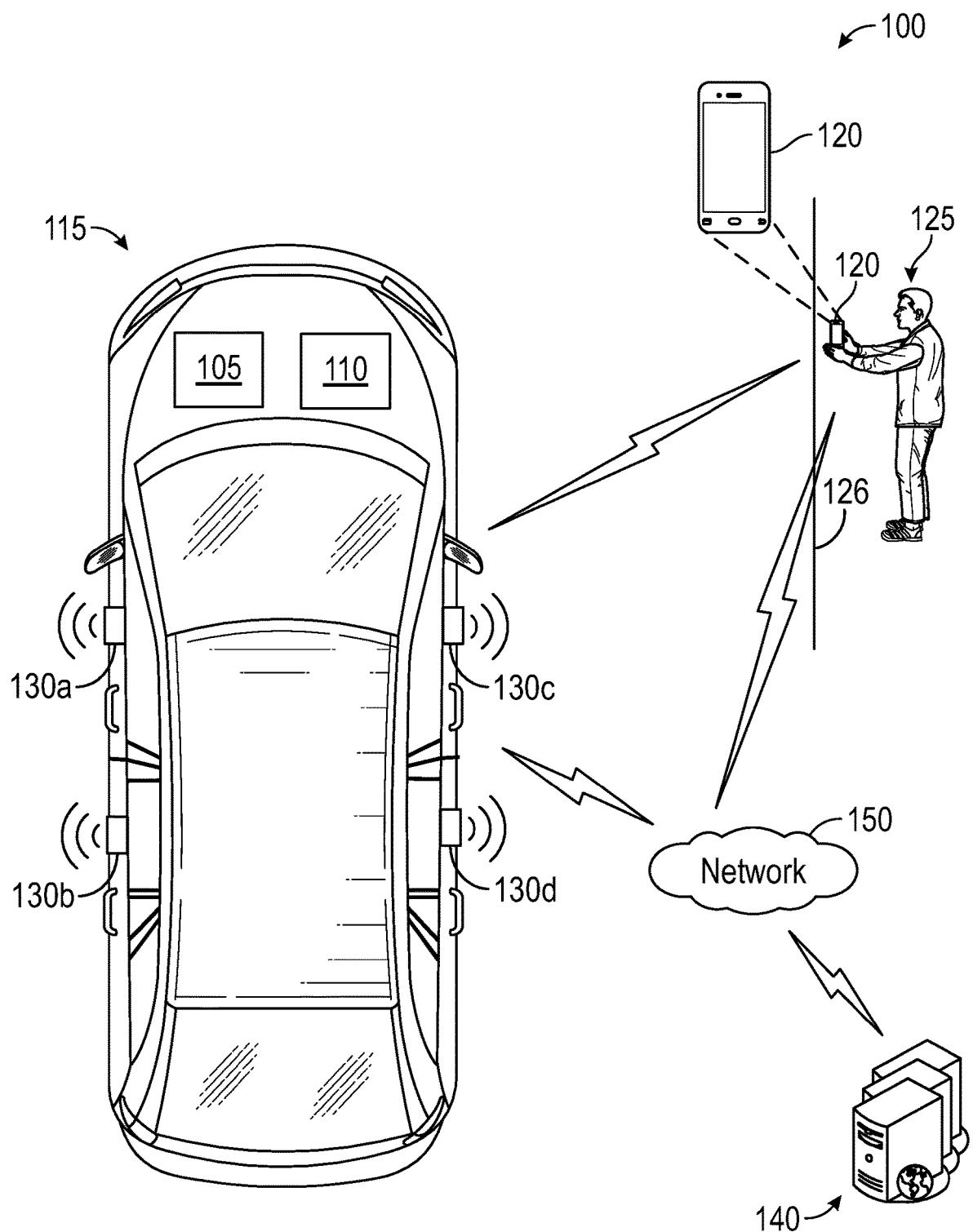
FIG. 1 illustrates an example autonomous vehicle management system that includes a user device used to control various operations of an autonomous vehicle in accordance with the disclosure.

In terms of a general overview, this disclosure is directed to systems and methods for directing a parked autonomous vehicle to travel to a pick up spot. In one example scenario, a user of a user device (e.g., the user of parked autonomous vehicle) may execute a software application on the user device (e.g., a smartphone) in order to summon a parked autonomous vehicle to a pickup spot chosen by the user. The autonomous vehicle may be parked in a parking spot in any parking area, such as, for example, a parking lot, a road, or a street. The software application displays a graphical rendering of the parking area together with a first icon that can be dragged and dropped by the user upon a pickup spot on the graphical rendering. The autonomous vehicle may respond to this action performed by the user by travelling to the pickup spot. A real-time representation of a progress of the autonomous vehicle moving from the parking spot to the pickup spot may be displayed on the user device. The user may enter the autonomous vehicle at the pickup spot.

In another example scenario, the user may execute the software application in the user device in order to command the parked autonomous vehicle to travel from a first parking spot to a second parking spot. The first parking spot may, for example, be located on a public road and the second parking spot may be located inside the premises of a building (a garage, for example).

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. It should also be understood that the word "example" as used herein is intended to be non-exclusionary and non-limiting in nature.

Furthermore, certain words and phrases that are used herein should be interpreted as referring to various objects and actions that are generally understood in various forms and equivalencies by persons of ordinary skill in the art. For example, the phrase "user device" as used herein is applicable to any device that a person can use to run software that performs various operations in accordance with the disclosure. Words such as "slot," "spot," and "area" may be used interchangeably and should be interpreted in the context of the description. Words such as "travel" and "drive" may also be used interchangeably and should be interpreted in the context of the description. The word "vehicle" as used in this disclosure can pertain to any one of various types of vehicles such as cars, vans, sports utility vehicles, trucks, electric vehicles, gasoline vehicles, and hybrid vehicles. The phrase "autonomous vehicle" as used in this disclosure generally refers to a vehicle that can perform at least a few operations without human intervention. At least some of the described embodiments are applicable to Level 2 vehicles, and may be applicable to higher level vehicles as well. The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment failures. The level of human intervention is very low. Level 5 (L5) vehicles are fully autonomous vehicles that do not involve human participation. The phrase "software application" as used herein with respect to a user device such as a smartphone, refers to various types of code (firmware, software, machine code etc.) that is installed in the user device and executed by the use of a human machine interface (HMI). The term HMI as used herein encompasses a graphical user interface (GUI) as well as various other interfaces.

FIG. 1 illustrates an example autonomous vehicle management system 100 wherein a user device 120 is used to control various operations of an autonomous vehicle 115 in accordance with the disclosure. The autonomous vehicle management system 100 may be implemented in a variety of ways and can include various type of devices. For example, the autonomous vehicle management system 100 can include some components that are a part of the autonomous vehicle 115, some that may be carried by an individual 125, and others that may be accessible via a communications network 150. The components that can be a part of the autonomous vehicle 115 can include a vehicle computer 105, an auxiliary operations computer 110, and a wireless communication system.

Components that may be used by the individual 125 can include a user device 120 that includes a display screen. Some examples of the user device 120 include a smartphone, a tablet computer, a laptop computer, and a desktop computer. In the illustrated example scenario, the user device 120 is a handheld device, such as a smartphone, that is held by the individual 125 standing on a curb 126. In another example scenario, the user device 120 can be a laptop computer or a desktop computer that is employed by the individual 125 when present inside a building, such as, for example, when seated in the lobby of a hotel or in an airport terminal.

The vehicle computer 105 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). The vehicle computer 105 may also control movement of the autonomous vehicle 115 along a travel route towards a designated destination. This operation may be executed by the vehicle computer 105 based on guidance from a navigation system in the autonomous vehicle 115.

The auxiliary operations computer 110 may cooperate with the user device 120 and the vehicle computer 105 to execute various operations in accordance with the disclosure. In some cases, some, or all, of the components of the auxiliary operations computer 110 may be integrated into the vehicle computer 105.

The wireless communication system can include a set of wireless communication nodes 130a, 130b, 130c, and 130d mounted upon the autonomous vehicle 115 in a manner that allows the auxiliary operations computer 110 and/or the vehicle computer 105 to communicate with devices such as the user device 120 carried by the individual 125. In an alternative implementation, a single wireless communication node may be mounted upon the roof of the autonomous vehicle 115. The wireless communication system may use one or more of various wireless technologies such as Bluetooth®, Ultra-Wideband (UWB), Wi-Fi, ZigBee®, Li-Fi (light-based communication), audible communication, ultrasonic communication, or near-field-communications (NFC), for carrying out wireless communications with devices such as the user device 120.

The auxiliary operations computer 110 and/or the vehicle computer 105 can also utilize the wireless communication system to communicate with a server computer 140 via the communications network 150. The communications network 150 may include any one network, or a combination of networks, such as a local area network (LAN), a wide area network (WAN), a telephone network, a cellular network, a cable network, a wireless network, and/or private/public networks such as the Internet. For example, the communications network 150 may support communication technologies such as Bluetooth®, Ultra-Wideband, cellular, near-field communication (NFC), Wi-Fi, Wi-Fi direct, Li-Fi, machine-to-machine communication, and/or man-to-machine communication. At least one portion of the communications network 150 includes a wireless communication link that allows the server computer 140 to communicate with one or more of the wireless communication nodes 130a, 130b, 130c, and 130d on the autonomous vehicle 115. The server computer 140 may communicate with the auxiliary operations computer 110 and/or the vehicle computer 105 for various purposes such as for providing information regarding an area in which the autonomous vehicle 115 is parked. The information can include, for example, items such as a map of the area, valid parking spots inside the area, and parts of the area where the autonomous vehicle 115 is not allowed to travel and/or park.

The user device 120 may communicate with the vehicle computer 105 via one or more of the first set of wireless communication nodes 130a, 130b, 130c, and 130d so as to allow the individual 125 (for example a driver who is outside the autonomous vehicle 115) to control the autonomous vehicle 115 from a remote location when performing operations in accordance with the disclosure.

In one example scenario in accordance with the disclosure, the individual 125 may be standing on the curb 126 at a roadway intersection and may execute a software application in the user device 120 to summon the autonomous vehicle 115 from a public parking slot located on a side street about a block away from where the individual 125 is standing. The individual 125 may opt to summon the autonomous vehicle 115 from the public parking slot to a pickup spot close to the roadway intersection. The individual 125 may track the progress of the autonomous vehicle 115 as the autonomous vehicle 115 travels from the public parking slot to the pickup spot, and enter the autonomous vehicle 115 when the autonomous vehicle 115 stops at the pickup spot. In another case, the individual 125 may opt to command the autonomous vehicle 115 to travel from the public parking slot to a driveway of a building, and can enter the autonomous vehicle 115 when the autonomous vehicle 115 stops on the driveway.

In another example scenario in accordance with the disclosure, the individual 125 may be standing near a door in front of a building (a hotel, for example) and may execute a software application in the user device 120 in order to summon the autonomous vehicle 115 from a parking garage located behind the building. The parking garage can be an open area in one case and a multistoried structure in another case. The autonomous vehicle 115 may be parked on any floor of the multistoried structure. The individual 125 may track the progress of the autonomous vehicle 115 as the autonomous vehicle 115 travels from the parking spot in the parking garage to a pickup spot near the door of the building. The individual 125 may then enter the autonomous vehicle 115 when the autonomous vehicle 115 stops at the pickup spot.

In yet another example scenario in accordance with the disclosure, the individual 125 may be in a room of a hotel after checking in overnight, and may execute a software application in the user device 120 to command the autonomous vehicle 115 to move from a public parking slot outside the hotel premises to a parking garage of the hotel. The individual 125 may track the progress of the autonomous vehicle 115 as the autonomous vehicle 115 travels from the public parking slot to an assigned parking slot in the parking garage of the hotel. The individual 125 may then remotely secure the autonomous vehicle 115 overnight when the autonomous vehicle 115 stops in the parking garage, and make use of the autonomous vehicle 115 the following morning.

Figure 2:
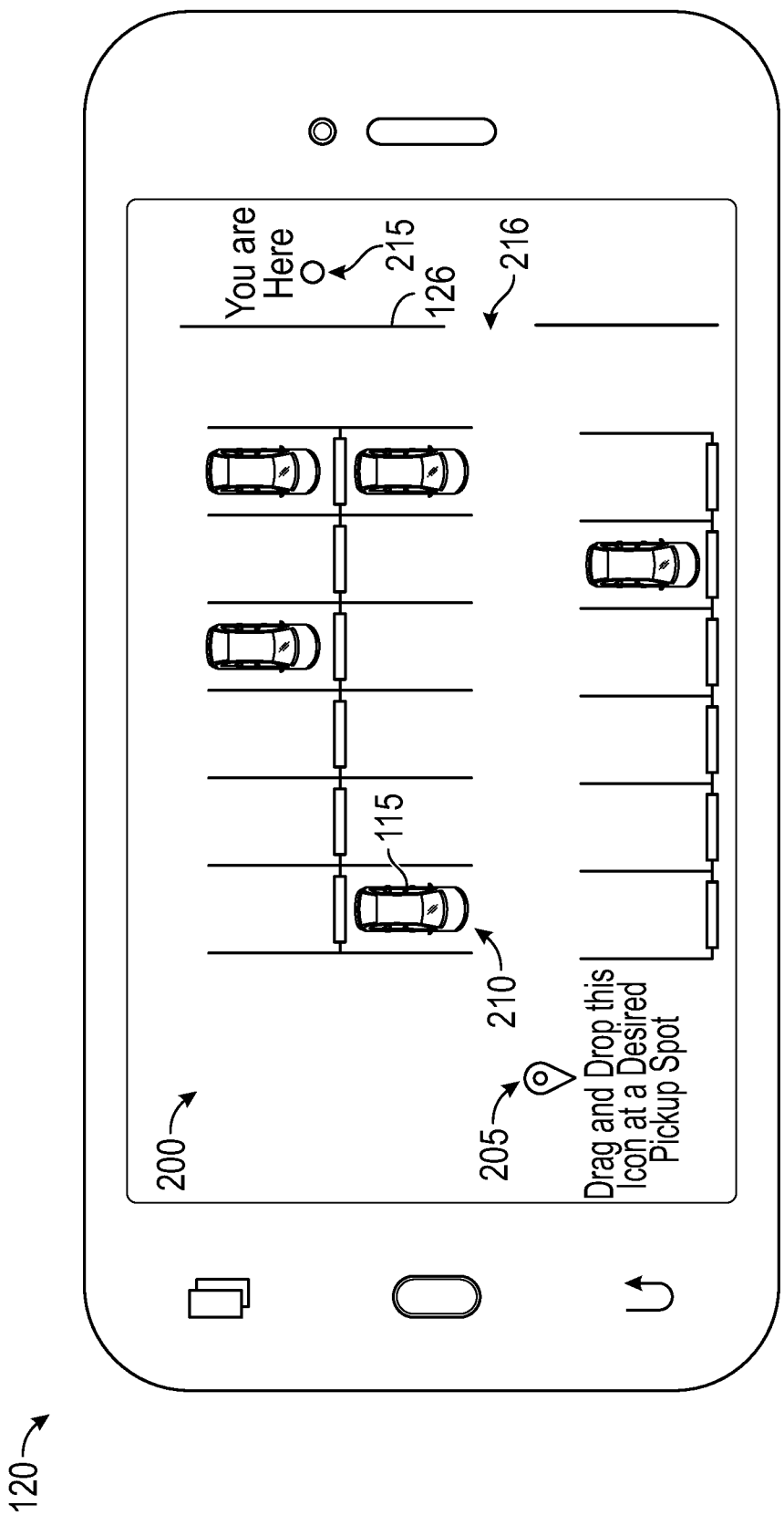
FIG. 2 illustrates a first graphical rendering on a user device in accordance with an example embodiment of the disclosure.

FIG. 2 illustrates a graphical rendering 200 on the user device 120 in accordance with an example embodiment of the disclosure. The graphical rendering 200 is displayed when a user of the user device 120 launches a software application for performing operations upon the autonomous vehicle 115 in accordance with the disclosure. In this example, the graphical rendering 200 includes a parking area in which the autonomous vehicle 115 is parked. The parking area is a parking lot with multiple parking slots, and the autonomous vehicle 115 is shown parked in a parking slot 210.

The graphical rendering 200 includes an icon 205 that is repositionable by a user of the user device 120. In one example scenario, the user device 120 is a smartphone having a touch screen and the individual 125 (the user) may use touch and drag the icon 205 from one location to another. Instructional text may be provided on the touch screen such as, for example, "Drag and drop this icon at a desired pickup spot."

The icon 205 may be located at a default position prior to moving by the individual 125. In one example case, the default position can be a predefined location, such as, for example, in a toolbar area. In another example case, the default position can be a "last placed" spot on which the individual 125 had placed the icon 205 when using the software application on a previous occasion. The "last placed" spot can be a pickup spot that the individual 125 had used previously when summoning the autonomous vehicle 115. In yet another example case, the default position can be a "most placed" spot on which the individual 125 had placed the icon 205 when using the software application on multiple occasions in the past.

In another example scenario, the user device 120 is a laptop computer and the individual 125 (the user) may use a mouse to move the icon 205 from one location to another on a display screen. Instructional text may be provided on the display screen such as, for example, "Position this icon at a desired pickup spot." The icon 205 may be located at a default position such as, for example, one of those described above.

The graphical rendering 200 can further include an icon 215 that indicates a position of the individual 125 who is using the user device 120. The user device 120 may use various types of object location techniques to determine placement of the icon 215 on the display screen of the user device 120 and may move the icon 215 in accordance with a movement of the individual 125 if the individual 125 moves from one spot to another. One example object location technique involves the user device 120 receiving signals from a global positioning system (GPS) satellite and determining GPS location coordinates of the user device 120. A message such as, for example, "You are here" may be displayed near the icon 215. In this example, the individual 125 is located near the curb 126 close to an exit 216 of the parking lot.

Figure 3:
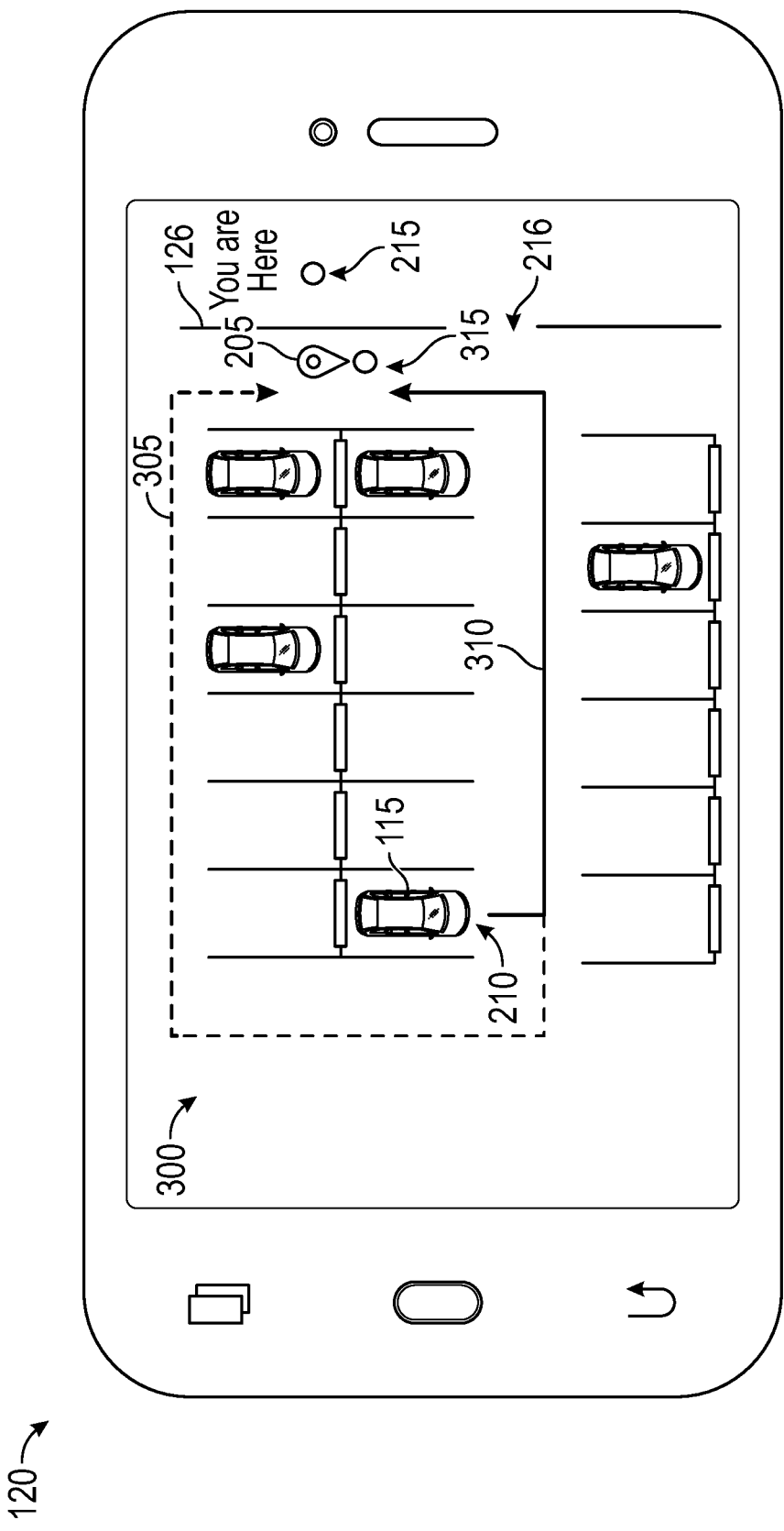
FIG. 3 illustrates a second graphical rendering on a user device in accordance with an example embodiment of the disclosure.

FIG. 3 illustrates a graphical rendering 300 on the user device 120 in accordance with an example embodiment of the disclosure. The graphical rendering 300 can be a modification of the graphical rendering 200 and is displayed when the individual 125 has moved the icon 205 from the default position to a pickup spot 315 that is located close to the curb 126 and near the individual 125. In this example, the individual 125 desires to command the autonomous vehicle 115 to travel from the parking slot 210 to the pickup spot 315. There are two travel routes that the autonomous vehicle 115 can use to reach the pickup spot 315—a first travel route 305 and a second travel route 310. The two travel routes may be identified by the user device 120 based on information stored in a database (not shown) of the user device 120 and/or obtained from the server computer 140.

In one example implementation, the two travel routes may be displayed on the user device 120 accompanied by instruction text such as, for example "Select a travel route for your vehicle." In one case, the individual 125 may opt to select the first travel route 305 because the autonomous vehicle 115 will be moving in a direction towards the exit 216 of the parking lot. In another case, the individual 125 may opt to select the second travel route 310 because the second travel route 310 is shorter than the first travel route 305 and the autonomous vehicle 115 can reach the individual 125 quicker.

In another example implementation, the two travel routes may not be displayed on the user device 120 and the user device 120 may automatically select one of the two travel routes based on various criteria, such as, for example, shortest travel distance or ease of maneuvering of the autonomous vehicle 115 through the parking lot.

Figure 4:
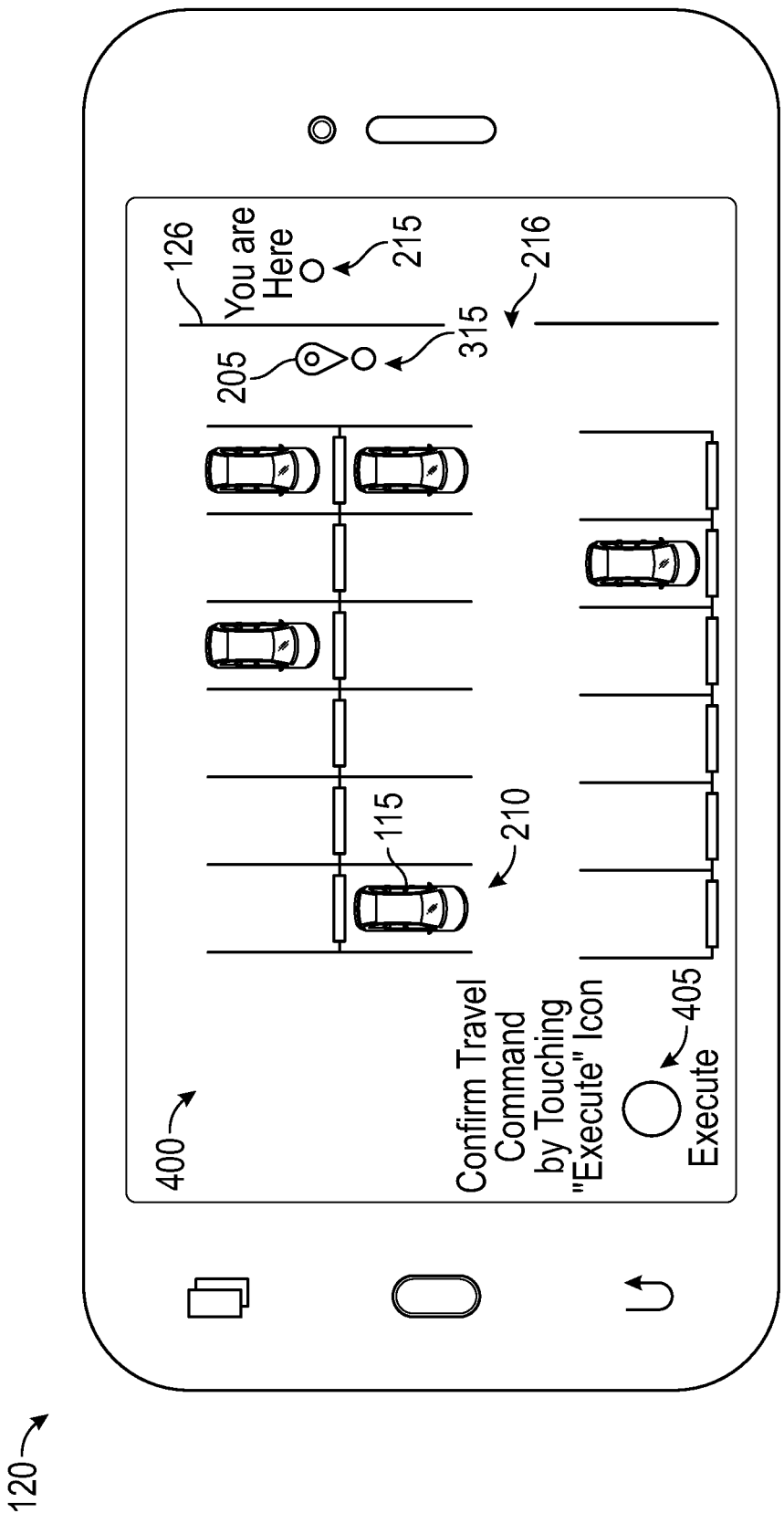
FIG. 4 illustrates a third graphical rendering on a user device in accordance with an example embodiment of the disclosure.

FIG. 4 illustrates a graphical rendering 400 on the user device 120 in accordance with an example embodiment of the disclosure. The graphical rendering 400 can be a modification of the graphical rendering 300 and can include a text instruction such as, for example, "Confirm travel command by touching "Execute" icon." The individual 125 may act based on the instruction and touch the icon 405. Upon recognizing the touch, the user device 120 may transmit a start command to the autonomous vehicle 115 to start traveling from the parking slot 210 to the pickup spot 315. The start command may be received by the auxiliary operations computer 110, which then cooperates with the vehicle computer 105 to set the autonomous vehicle 115 in motion and to guide the autonomous vehicle 115 to the pickup spot 315.

In an example implementation, the graphical rendering 400 may be updated in real-time in order to display to the individual 125, a progress of the autonomous vehicle 115 as the autonomous vehicle 115 moves from the parking slot 210 to the pickup spot 315. The real-time representation may be indicated by movement of an icon in the shape of a vehicle along a travel route towards the pickup spot 315.

In an example situation, the individual 125 may decide to enter a stop command into the user device 120 to command the autonomous vehicle 115 to stop when traveling towards the pickup spot 315. For example, the individual 125 may decide to delay the arrival of the autonomous vehicle 115 at the pickup spot 315. The user device 120 may transmit a stop command to the autonomous vehicle 115. The stop command may be received by the auxiliary operations computer 110, which then cooperates with the vehicle computer 105 to stop the autonomous vehicle 115 at a closest location that is safe for stopping. The individual 125 may subsequently enter a resume command into the user device 120 to command the autonomous vehicle 115 to resume travel towards the pickup spot 315.

In another example situation, the individual 125 may decide to change a location of the pickup spot 315. This operation may be carried out by the individual 125 moving the icon 205 from the current location (pickup spot 315) to a new pickup spot, and entering a reroute command into the user device 120. The user device 120 may transmit the reroute command to the autonomous vehicle 115. The reroute command may be received by the auxiliary operations computer 110, which then cooperates with the vehicle computer 105 to reroute the autonomous vehicle 115 towards the new pickup spot.

In yet another example situation, the autonomous vehicle 115 may detect an obstacle in its path. For example, another vehicle may pull out of a parking spot and block the travel path of the autonomous vehicle 115. In this case, the autonomous vehicle 115 autonomously stops and/or autonomously selects an alternative travel route to reach the pickup spot 315. The individual 125 can observe and monitor this autonomous action in real-time of the graphical representation displayed in the user device 120.

Figure 5:
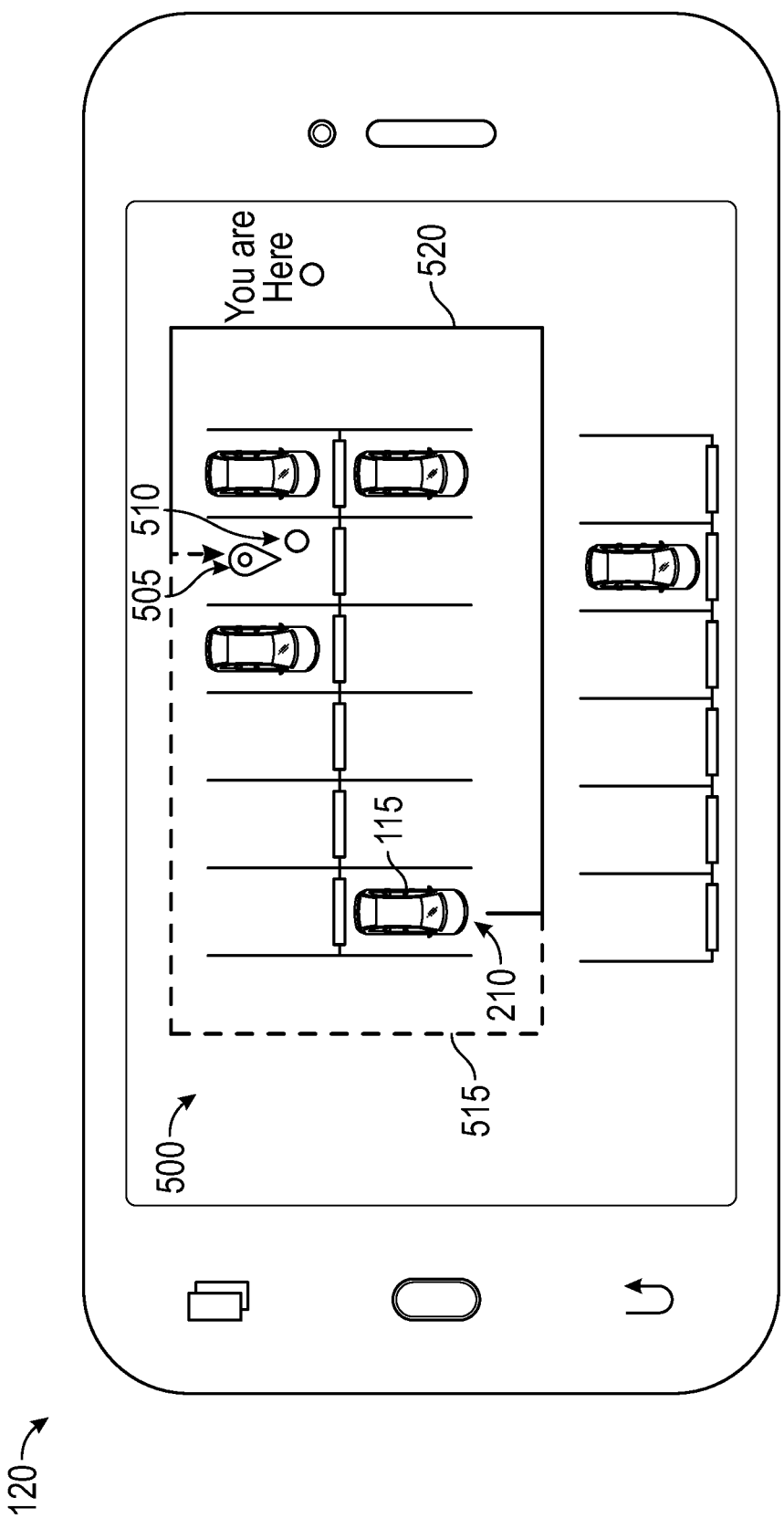
FIG. 5 illustrates a fourth graphical rendering on a user device in accordance with an example embodiment of the disclosure.

FIG. 5 illustrates a graphical rendering 500 on the user device 120 in accordance with an example embodiment of the disclosure. The graphical rendering 500 can be a modification of the graphical rendering 200 (described above) and is displayed when the individual 125 has moved the icon 205 from the default position shown in FIG. 2 to a pickup spot 510 that is located in an unoccupied parking slot 505 in the same parking lot.

In this example, the individual 125 desires to command the autonomous vehicle 115 to travel from the parking slot 210 to the pickup spot 510. There are two alternate travel routes that the autonomous vehicle 115 can use to reach the pickup spot 510—a first travel route 515 and a second travel route 520.

In one implementation, as described above, the individual 125 is provided the option to select one of the two travel routes. The individual 125 may opt to select the second travel route 520 if, for example, the individual 125 desires to have a line of sight to the autonomous vehicle 115 as the autonomous vehicle 115 travels past the curb 126, or may opt to select the shorter first travel route 515 and have the autonomous vehicle 115 reach the pickup spot 510 quicker.

In another example implementation, the two travel routes may not be displayed on the user device 120 and the user device 120 may automatically select one of the two travel routes based on various criteria, such as, for example, shortest travel distance or ease of maneuvering of the autonomous vehicle 115 through the parking lot.

Figure 6:
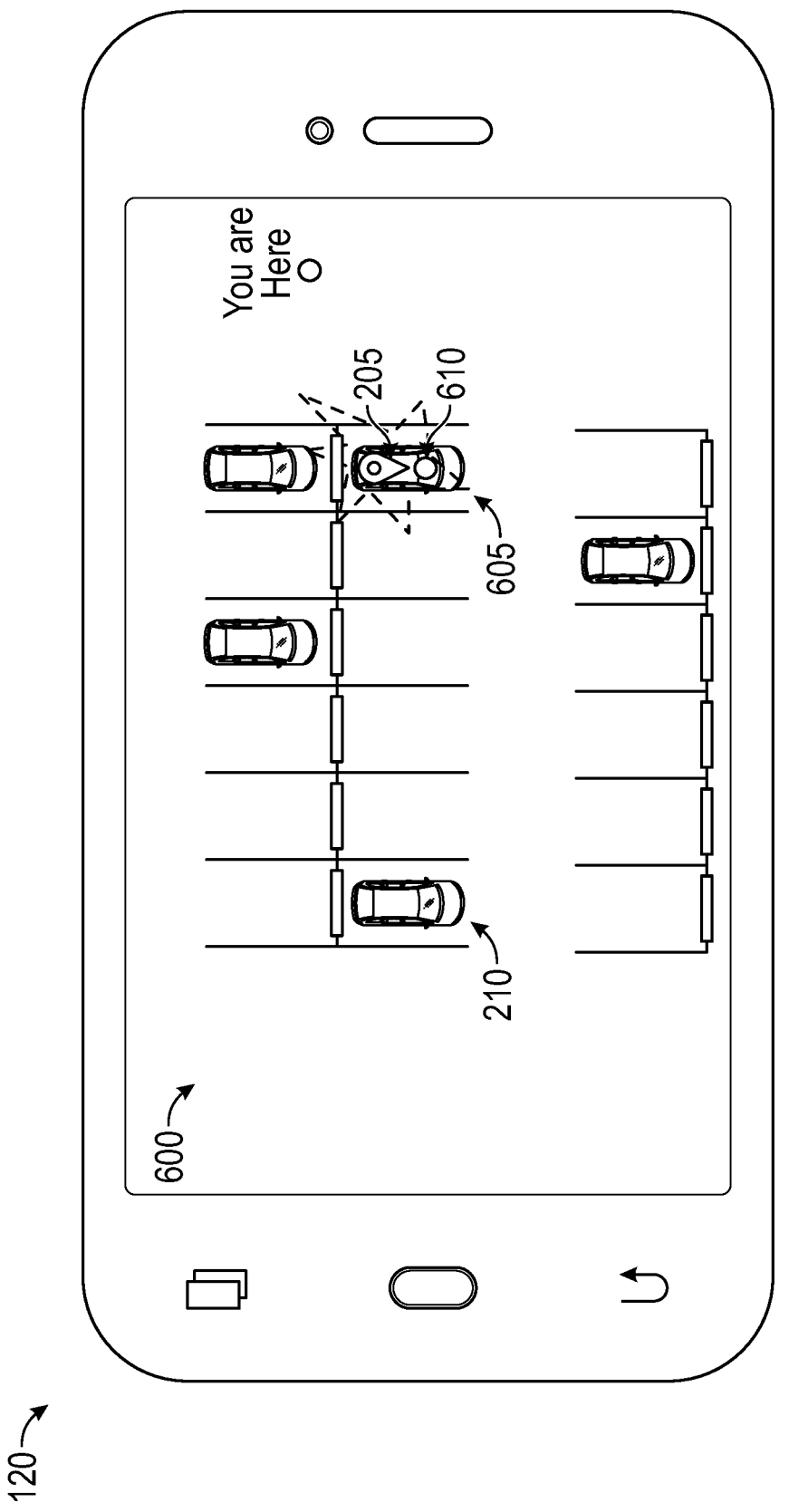
FIG. 6 illustrates a fifth graphical rendering on a user device in accordance with an example embodiment of the disclosure.

FIG. 6 illustrates a graphical rendering 600 on the user device 120 in accordance with an example embodiment of the disclosure. The graphical rendering 600 can be a modification of the graphical rendering 200 (described above) and is displayed when the individual 125 has moved the icon 205 from the default position shown in FIG. 2 to a pickup spot 610 that is located in an occupied parking slot 605 in the parking lot. The user device 120 will automatically display a warning (such as a flashing red graphic) to indicate to the individual 125 that the pickup spot 610 is located at an invalid parking area.

The user device 120 may then display all areas in the parking lot that are valid for placement of the icon 205 and areas that are not valid. This information may be obtained from a database in the user device 120 and/or from the server computer 140. The valid areas, which may be indicated in green, for example, typically includes all areas in which the autonomous vehicle 115 can park, such as, for example, curbside spots and unoccupied parking slots. The valid areas can also include various travel paths for the autonomous vehicle 115 in the parking lot. Invalid parking areas such as a sidewalk or an occupied parking slot may be indicated in red, for example.

In some implementations, the valid parking areas and/or the invalid parking areas may be displayed prior to the individual moving the icon 205 from the default position so as to help prevent placement of the icon 205 upon locations such as the occupied parking slot 605.

Figure 7:
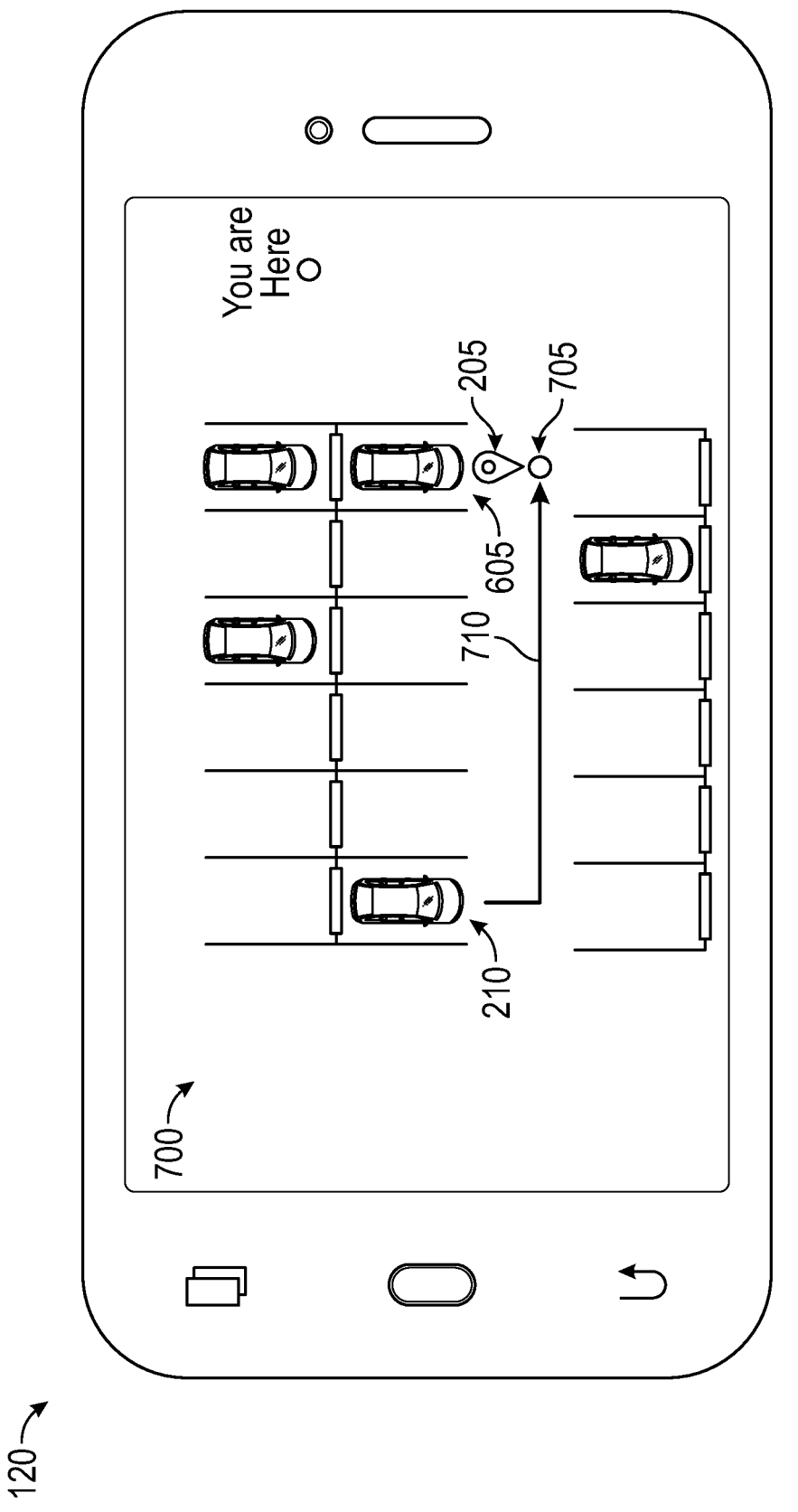
FIG. 7 illustrates a sixth graphical rendering on a user device in accordance with an example embodiment of the disclosure.

FIG. 7 illustrates a graphical rendering 700 on the user device 120 in accordance with an example embodiment of the disclosure. The graphical rendering 700 can be a modification of the graphical rendering 600 (described above) and is displayed when the individual 125 has moved the icon 205 from the default position shown in FIG. 2 to a pickup spot 610 that is located in an occupied parking slot 605 in the parking lot. The user device 120 will display a warning (such as a flashing red graphic) to indicate to the individual 125 that the pickup spot 610 is located in an invalid parking area and automatically detect and move the icon 205 to another pickup spot 705 that is located in a valid parking area (area highlighted in green, for example) or an area not highlighted. The individual 125 may reposition the icon 205 from the pickup spot 705 to another valid parking area if he/she so chooses. The autonomous vehicle 115 can then travel along a valid travel path 710 to reach the pickup spot 705 designated by the user device 120 or to a repositioned parking spot chosen by the individual 125.

Figure 8:
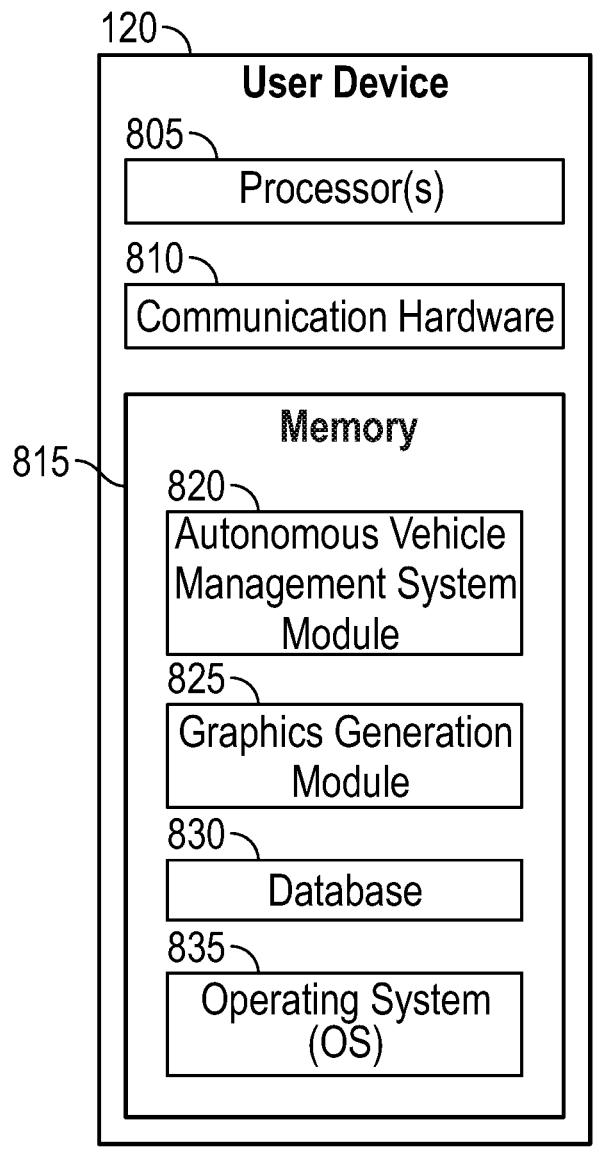
FIG. 8 shows some example components that may be included in a user device in accordance with the disclosure.

FIG. 8 shows some example components that may be included in the user device 120 of the autonomous vehicle management system 100 in accordance with the disclosure. In this example configuration, the user device 120 can include a processor 805, communication hardware 810, and a memory 815. The communication hardware 810 can include one or more wireless transceivers, such as, for example, a cellular transceiver (when the user device 120 is a cellular phone) or a Wi-Fi transceiver (when the user device 120 is a laptop computer, for example) that allows the user device 120 to transmit and/or receive various types of wireless signals to/from the autonomous vehicle 115. The communication hardware 810 can also include hardware for communicatively coupling the user device 120 to the communications network 150 for carrying out communications and data transfers with the server computer 140. The communication hardware 810 can apply various security measures to ensure that messages transmitted between the user device 120 and the autonomous vehicle 115 are not intercepted for malignant purposes. For example, the communication hardware 810 may be configured to provide features such as encryption and decryption of messages and apply radio-frequency (RF) safeguards for RF signal transmissions.

The memory 815, which is one example of a non-transitory computer-readable medium, may be used to store an operating system (OS) 835 and various code modules such as, for example, an autonomous vehicle management system module 820 and a graphics generation module 825. The code modules are provided in the form of computer-executable instructions that can be executed by the processor 805 for performing various operations in accordance with the disclosure. The memory 815 can also include a database 830 that may be used to store information such as, for example, a map of a parking lot, valid parking areas in the parking lot, prohibited parking areas in the parking lot, and travel paths in the parking lot.

In one example implementation, the autonomous vehicle management system module 820 can be a software application that is downloaded into the user device 120 from a source such as, for example, FordPass®. The autonomous vehicle management system module 820 may be executed by the processor 805 for performing various operations related to directing the autonomous vehicle 115 from one parking spot to another. For example, the autonomous vehicle management system module 820 may cooperate with the communication hardware 810, the graphics generation module 825, and the database 830 to generate the various graphical renderings, and to perform various operations such as the ones described above.

Figure 9:
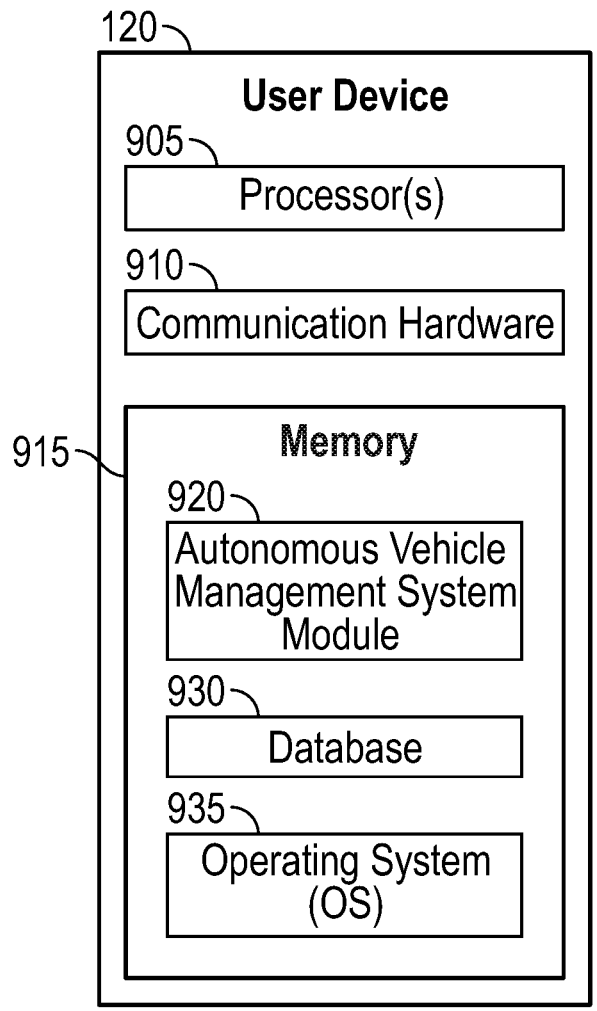
FIG. 9 shows some example components that may be included in an auxiliary operations computer of an autonomous vehicle in accordance with the disclosure.

FIG. 9 shows some example components that may be included in the auxiliary operations computer 110 (and/or the vehicle computer 105) in accordance with the disclosure. In this example configuration, the auxiliary operations computer 110 can include a processor 905, communication hardware 910, and a memory 915. The communication hardware 910 can include one or more wireless transceivers, such as, for example, a Bluetooth® Low Energy Module (BLEM), a cellular transceiver, or a Wi-Fi transceiver, that allows the auxiliary operations computer 110 to transmit and/or receive various types of signals to/from the user device 120. The communication hardware 910 can also include hardware for communicatively coupling the auxiliary operations computer 110 to the communications network 150 for carrying out communications and data transfers with the server computer 140. In an example embodiment in accordance with the disclosure, the communication hardware 910 includes various security measures to ensure that messages transmitted between the autonomous vehicle 115 and the user device 120 are not intercepted for malignant purposes. For example, the communication hardware 910 may be configured to provide features such as encryption and decryption of messages and apply radio-frequency (RF) safeguards for RF signal transmissions.

The memory 915, which is another example of a non-transitory computer-readable medium, may be used to store an operating system (OS) 935 and various code modules such as, for example, an autonomous vehicle management system module 920. The code modules are provided in the form of computer-executable instructions that can be executed by the processor 905 for performing various operations in accordance with the disclosure. The memory 915 can also include a database 930 that may be used to store information such as, for example, a map of a parking lot, valid parking areas in the parking lot, prohibited parking areas in the parking lot, and travel paths in the parking lot.

In one example implementation, the autonomous vehicle management system module 920 can be a software application that is installed in the autonomous vehicle 115 by an entity such as a manufacturer, a sales agency, a lessee, or an owner of the autonomous vehicle 115. The autonomous vehicle management system module 920 may be executed by the processor 905 for performing various operations related to move the autonomous vehicle 115 from one parking spot to another. For example, the autonomous vehicle management system module 920 may cooperate with the communication hardware 910 and the database 830 to determine a travel path for the autonomous vehicle to travel from one parking spot to another.

Figure 10:
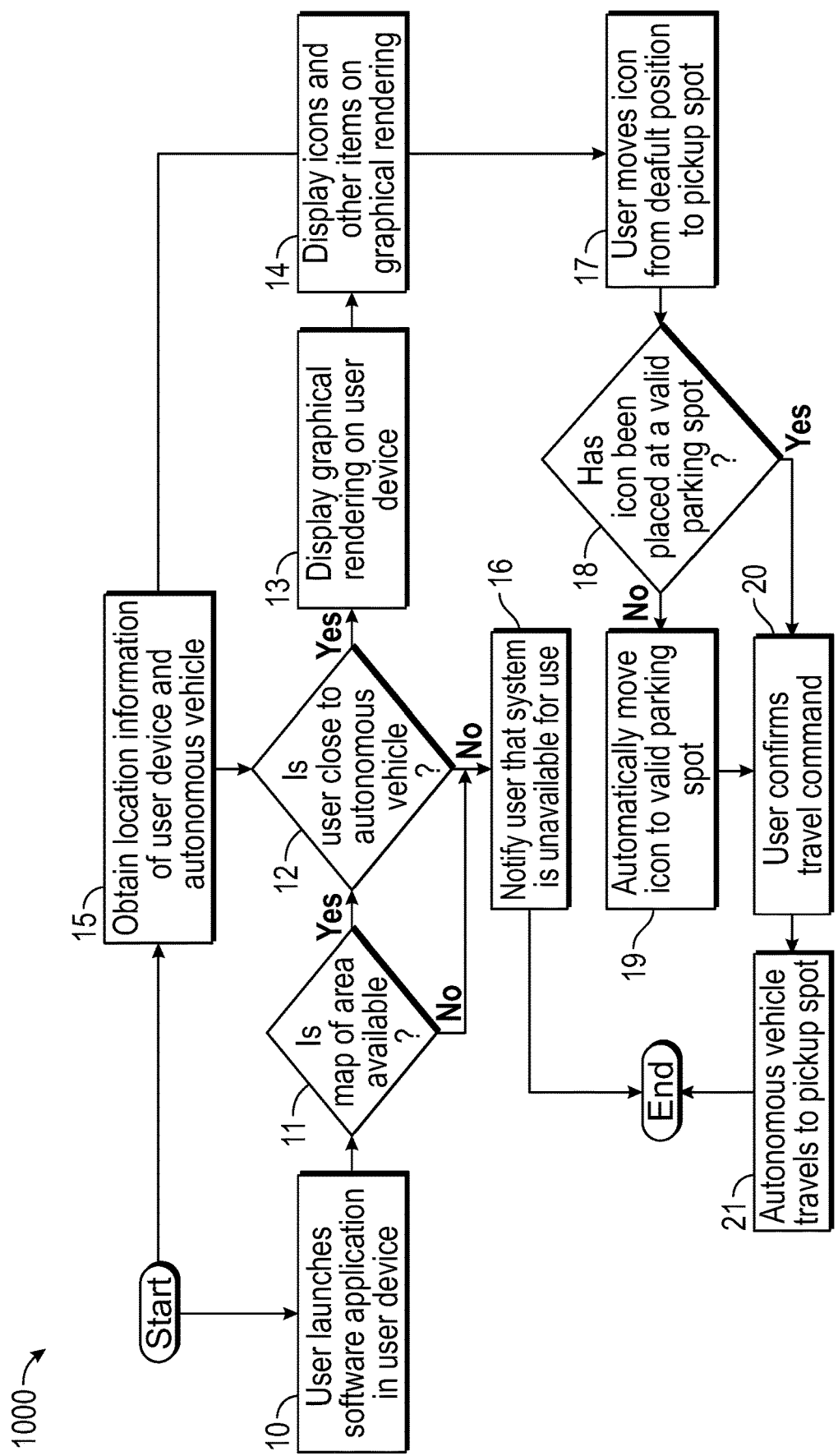
FIG. 10 shows a first example flowchart of a method for directing an autonomous vehicle to travel from a first parking spot to a second parking spot in accordance with the disclosure.

FIG. 10 shows a flowchart 1000 of a method for directing the autonomous vehicle 115 to travel from a first parking spot to a second parking spot. The second parking spot can be a pickup spot in some cases and a new parking spot in some other cases. The flowchart 1000 illustrates a sequence of operations that can be implemented in hardware, software, or a combination thereof. In the context of software, the operations represent computer-executable instructions stored on one or more non-transitory computer-readable media such as the memory 815 and the memory 915, that, when executed by one or more processors such as the processor 805 and the processor 905, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

Some or all of the operations described in the flowchart 1000 may be executed by a user of a user device, such as, for example, by the individual 125 operating the user device 120. The operations are generally carried out by the user device 120 cooperating with the auxiliary operations computer 110 and/or the vehicle computer 105 of the autonomous vehicle 115, and other components such as a security camera located on the premises of a parking lot, and the server computer 140. The description below may make reference to certain components shown in FIGS. 1-7, but it should be understood that this is done for purposes of explaining certain aspects of the disclosure and it should also be understood that the description is equally applicable to many other scenarios and embodiments.

At block 10, the individual 125 launches a software application on the user device 120 in order to perform various actions in accordance with the disclosure.

At block 11, the user device 120 makes a determination whether a map is available of an area in which the autonomous vehicle 115 is parked (for example, the parking lot described above).

If no map is available, at block 16, the user device 120 displays a message to inform the individual 125 that the autonomous vehicle management system 100 is not available for use at the current location.

If a map is available, at block 12, the user device 120 makes a determination whether the individual 125 is located close to the autonomous vehicle 115.

In one implementation, the determination whether the individual 125 is located close to the autonomous vehicle 115 may be made by evaluating a video clip and/or images of the parking area. The video clip and/or images may be obtained (at block 15) from one or more imaging systems that are arranged to capture images of the parking area. The imaging system(s) may be a part of a security system provided on the premises of the parking lot and can include devices such as digital cameras, video cameras, and video recorders. Evaluating the video clip and/or images can include determining a separation distance between the individual 125 and the autonomous vehicle 115. The separation distance can then be compared to a threshold separation distance to determine if the individual 125 is close to the autonomous vehicle 115.

In another implementation, the determination whether the individual 125 is located close to the autonomous vehicle 115 may be made on the basis of a wireless communication range between the user device 120 and the autonomous vehicle 115. For example, in one case, the individual 125 may be located too far from the autonomous vehicle 115 and a communication signal transmitted by the user device 120 to the autonomous vehicle 115 may be unable to reach the autonomous vehicle 115. The user device 120 may then conclude that the individual 125 is not close to the autonomous vehicle 115. Conversely, if communications between the user device 120 and the autonomous vehicle 115 is established, the user device 120 may conclude that the individual 125 is close to the autonomous vehicle 115.

In yet another implementation, the determination whether the individual 125 is located close to the autonomous vehicle 115 may be made on the basis of a line-of-sight visibility between the individual 125 and the autonomous vehicle 115. The line-of-sight visibility may be desirable for various reasons such as, for example, safety reasons and conformance to governmental regulations.

If the individual 125 is not near the autonomous vehicle 115, at block 16, the user device 120 displays a message to inform the individual 125 that the autonomous vehicle management system 100 is not available for use at the current location.

If the individual 125 is near the autonomous vehicle 115, at block 13, a graphical rendering of the parking lot is displayed on the user device 120. The graphical rendering may be displayed as a HMI that the individual 125 can use to enter commands into the user device 120 and to carry out actions such as moving the icon 205 from one location to another.

At block 14, various icons and graphical representations are included in the graphical rendering such as, for example, a graphical representation of the autonomous vehicle 115 (and other vehicles in the parking lot), the icon 205, the icon 215, and structural items such as the curb 126 and markings denoting the various parking slots in the parking area. This operation may be carried out by the user device 120 obtaining location information of various objects in the parking area. The location information can be obtained at block 15.

In one implementation, the graphical rendering may only display stationary objects such as parked vehicles, structures, and the individual 125 (when standing on the curb 126). In another implementation, the graphical rendering may display stationary objects such as parked vehicles and structures such as the curb 126 and the parking slots, and may also display moving objects such as, for example, a vehicle entering the parking lot, a vehicle exiting the parking lot, a vehicle moving around in the parking lot, and/or a vehicle pulling into a parking spot.

At block 17, the individual 125 moves the icon 205 from a default position on the display screen to a desired parking spot, which can be a pickup spot in one scenario. At block 18, a determination is made whether the icon 205 has been placed at a valid parking spot. If the icon 205 has not been placed at a valid parking spot (for example, as described above with respect to FIG. 6), at block 19, the icon 205 is automatically moved to a valid parking spot (as described above with respect to FIG. 7, for example).

If the icon 205 has been placed at a valid parking spot (or automatically moved to a valid parking spot), at block 20, the individual 125 confirms the travel command (for example, as described above with respect to FIG. 4). At block 21, the autonomous vehicle 115 travels to the parking spot identified by the icon 205.

Figure 11:
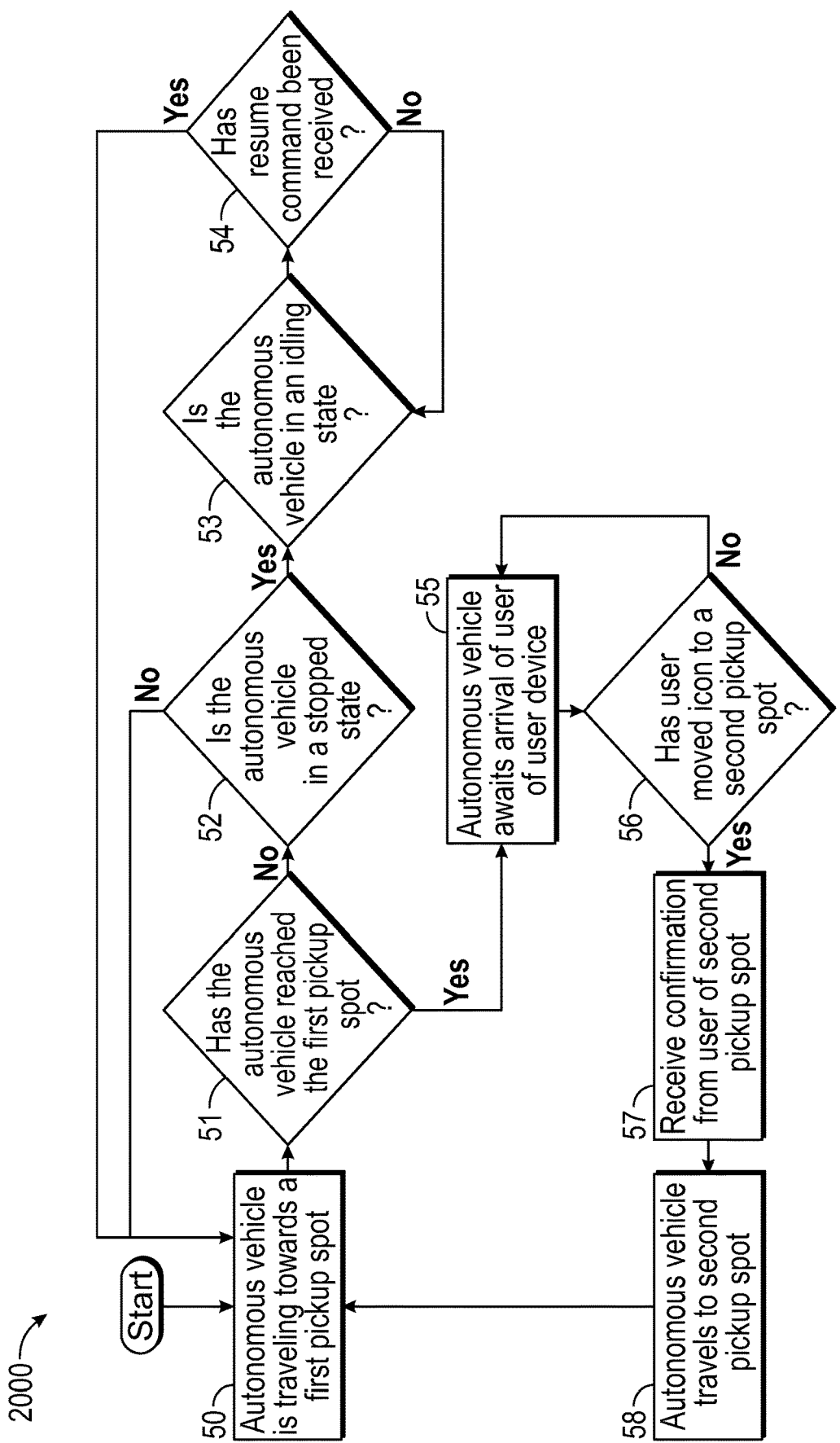
FIG. 11 shows a second example flowchart of a method for directing an autonomous vehicle to travel from a first parking spot to a second parking spot in accordance with the disclosure.

FIG. 11 shows a flowchart 2000 of a method for directing the autonomous vehicle 115 from a first pickup spot to a second pickup spot when the individual 125 changes his/her mind. The remarks provided above with respect to the characteristics of the flowchart 1000 are applicable to the flowchart 2000 as well (such as representing a sequence of operations that can be implemented in hardware, software, or a combination thereof).

At block 50, the autonomous vehicle 115 is traveling towards a first pickup spot that was designated by the individual 125 (by moving the icon 205 from a default position to the first parking spot). At block 51, a determination is made whether the autonomous vehicle 115 has reached the first pickup spot. If the autonomous vehicle 115 has not yet reached the first pickup spot, at block 52, a determination is made whether the autonomous vehicle 115 is in a stopped state (for example, in response to a stop command issued by the individual 125).

If the autonomous vehicle 115 is in a stopped state, the autonomous vehicle 115 goes into an idle state and awaits a resume command to resume travel towards the first pickup spot. This action is indicated by the sequence of operations at block 53 and block 54, followed by the action indicated at block 50.

If the autonomous vehicle 115 has reached the first pickup spot, at block 55, the autonomous vehicle 115 awaits the arrival of the individual 125 at the first pickup spot. At block 56, a determination is made whether the individual 125 has changed his/her mind and moved the icon 205 to a second pickup spot. If the individual 125 has not changed his/her mind and moved the icon 205 to a second pickup spot, the autonomous vehicle 115 awaits the arrival of the individual 125 at the first pickup spot. If the individual 125 has changed his/her mind and moved the icon 205 to a second pickup spot, at block 57, a confirmation is received from the individual 125 confirming the second pickup location as a new pickup location. At block 58, the autonomous vehicle 115 travels to the second parking spot identified by repositioning of the icon 205.

Figure 12:
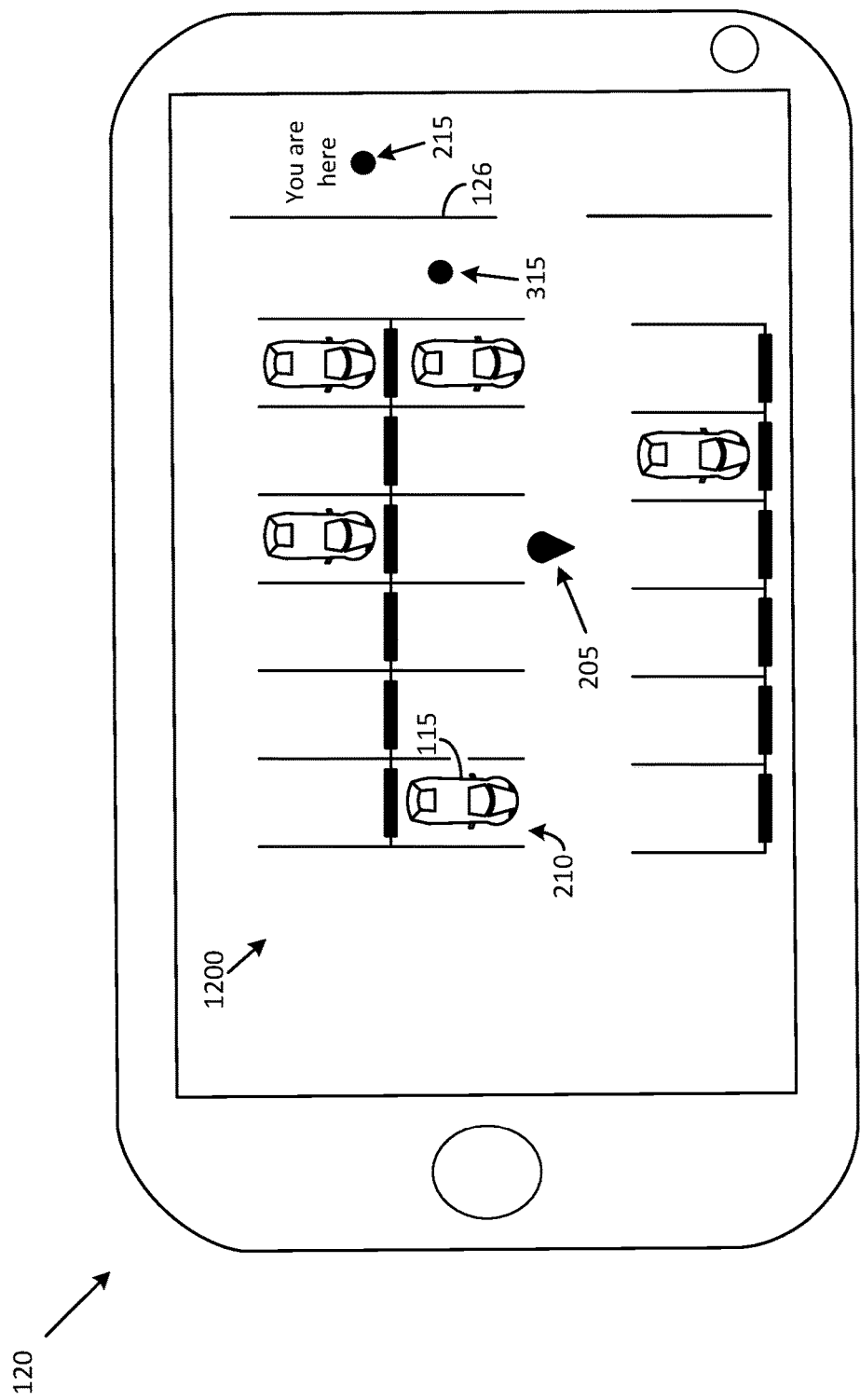
FIG. 12 illustrates a sixth graphical rendering on a user device in accordance with an example embodiment of the disclosure.
Figure 13:
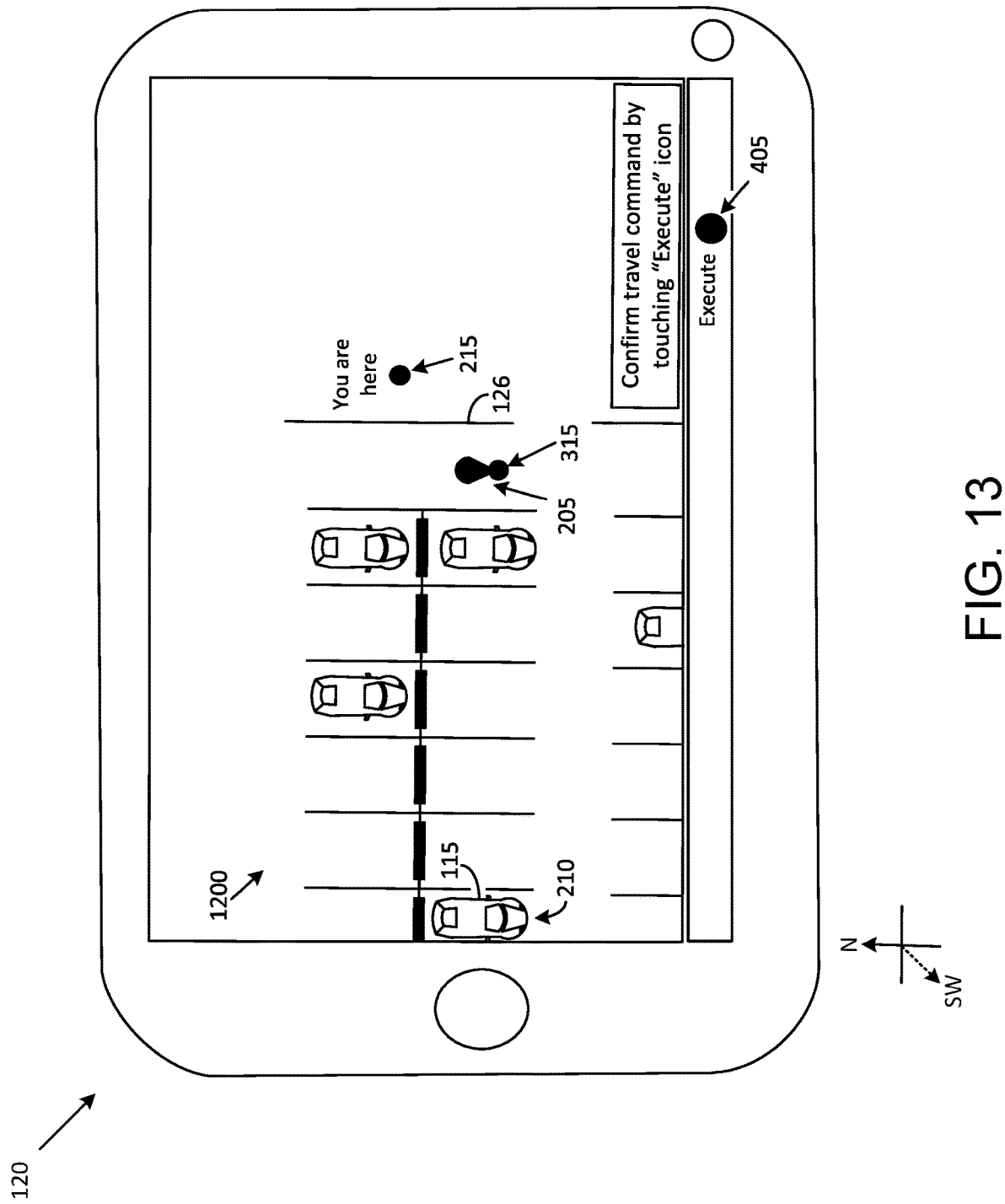
FIG. 13 illustrates a seventh graphical rendering on a user device in accordance with an example embodiment of the disclosure.

FIG. 12 illustrates a graphical rendering 1200 on the user device 120 in accordance with another example embodiment of the disclosure. In this embodiment, the icon 205 is configured to remain stationary at a default position on the graphical rendering 1200, such as, for example, at a central location as shown. A method of using the graphical rendering 1200 to designate the pickup spot 315 involves the individual 125 moving the graphical rendering 1200 with respect to the stationary icon 205 so as to align the pickup spot 315 with the icon 205. The repositioned graphical rendering 1200 is illustrated in FIG. 13 where the graphical rendering 1200 has been moved in a south-westerly direction for aligning the pickup spot 315 with the icon 205. The execute button 405 may be provided at any suitable location such as, for example, in a tab provided below the graphical rendering 1200.

Moving the graphical rendering 1200 with respect to the stationary icon 205 is an alternative procedure to the one described above with reference to FIG. 3, wherein the icon 205 is moved with respect to the stationary graphical rendering 300 for aligning the icon 205 with the pickup spot 315.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 815, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, user devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   displaying, on a display screen of a user device, a graphical rendering of an area that includes a first parking spot in which an autonomous vehicle is parked, the first parking spot being presented at a first portion of the graphical rendering;
   designating, by a user of the user device, a second parking spot on the graphical rendering by positioning an icon upon a second portion of the graphical rendering, wherein the second parking spot is indicative of a pickup spot;
   providing, by the user device and based on the user positioning the icon upon the second portion of the graphical rendering, a warning to the user that positioning the icon in the second portion of the graphical rendering is an invalid operation;
   automatically determining, by the user device, a third parking spot that is a valid parking spot;
   automatically moving the icon from the second portion of the graphical rendering to a third portion of the graphical rendering associated with the third parking spot;
   designating the third parking spot as the pickup spot;
   providing, in the graphical rendering, a first graphical representation of a first travel route for the autonomous vehicle to travel to the third parking spot and a second graphical representation for a second travel route for the autonomous vehicle to travel to the third parking spot;
   receiving an indication of a selection executed upon the graphical rendering of the first travel route instead of the second travel route;
   detecting a travel command executed upon the graphical rendering by the user; and
   transmitting, by the user device and to the autonomous vehicle, a start command directing the autonomous vehicle to travel from the first parking spot to the third parking spot using the first travel route based on the indication of the selection of the first travel route.

2. The method of claim 1, wherein the autonomous vehicle starts traveling along a travel route from the first parking spot to the pickup spot, the method further comprising:
   detecting, by the user device, a stop command; and
   transmitting, by the user device to the autonomous vehicle, the stop command directing the autonomous vehicle to stop at a closest location that is safe for stopping.

3. The method of claim 1, wherein the autonomous vehicle starts traveling along a travel route from the first parking spot to the pickup spot, the method further comprising:
   detecting, by the autonomous vehicle, an obstacle on the travel route; and
   stopping the autonomous vehicle on the travel route or traveling on an alternative route in response to detecting the obstacle.

4. The method of claim 1, wherein the autonomous vehicle initiates traveling along a travel route from the first parking spot to the pickup spot, the method further comprising:
   detecting, by the user device and subsequent to the autonomous vehicle initiating traveling along the travel route, a positioning of the icon upon an alternative pickup spot that is chosen by the user; and transmitting to the autonomous vehicle, a reroute command directing the autonomous vehicle to travel to the alternative pickup spot.

5. A user device comprising:
a display screen;
a memory that stores computer-executable instructions; and
a processor configured to access the memory and execute the computer-executable instructions to at least:
display, on the display screen, a graphical rendering of an area in which an autonomous vehicle is parked in a first parking spot, the first parking spot being presented at a first portion of the graphical rendering;
designate a second parking spot on the graphical rendering based on a user positioning an icon upon a second portion of the graphical rendering, wherein the second parking spot is indicative of a pickup spot;
provide, by the user device and based on the user positioning the icon upon the second portion of the graphical rendering, a warning to the user that positioning the icon in the second portion of the graphical rendering is an invalid operation;
automatically determine, by the user device, a third parking spot that is a valid parking spot;
automatically move the icon from the second portion of the graphical rendering to a third portion of the graphical rendering associated with the third parking spot; and
designate the third parking spot as the pickup spot;
provide, in the graphical rendering, a first graphical representation of a first travel route for the autonomous vehicle to travel to the third parking spot and a second graphical representation for a second travel route for the autonomous vehicle to travel to the third parking spot;
receive an indication of a selection executed upon the graphical rendering of the first travel route instead of the second travel route; and
transmit to the autonomous vehicle, a start command directing the autonomous vehicle to travel from the first parking spot to the pickup spot using the first travel route based on the indication of the selection of the first travel route.

6. The user device of claim 5, wherein the first portion comprises a travel route for the autonomous vehicle to travel to the pickup spot from the parking spot in which the autonomous vehicle is parked.

7. The user device of claim 6, wherein the processor is configured to access the memory and execute additional computer-executable instructions to:
detect a stop command that is entered into the user device by a user of the user device; and
transmit to the autonomous vehicle, the stop command directing the autonomous vehicle to stop at a closest location that is safe for stopping.

8. The user device of claim 7, wherein the processor is configured to access the memory and execute additional computer-executable instructions to:
detect a resume command that is entered into the user device by the user; and
transmit to the autonomous vehicle, the resume command directing the autonomous vehicle to resume travel along the travel route.

9. The user device of claim 5, wherein the processor is configured to access the memory and execute additional computer-executable instructions to:
display on the display screen, a real-time representation of a progress of the autonomous vehicle as the autonomous vehicle moves from the parking spot to the pickup spot.

10. The user device of claim 9, wherein the processor is configured to access the memory and execute additional computer-executable instructions to:
detect, subsequent to the autonomous vehicle initiating traveling along the first travel route, a placement of the icon upon an alternative pickup spot that is chosen by a user of the user device; and
transmit to the autonomous vehicle, a reroute command directing the autonomous vehicle to travel to the alternative pickup spot.

* * * * *